(No Model.)
C. C. DAVIS.
COOKING UTENSIL.
No. 412,730. Patented Oct. 15, 1889.
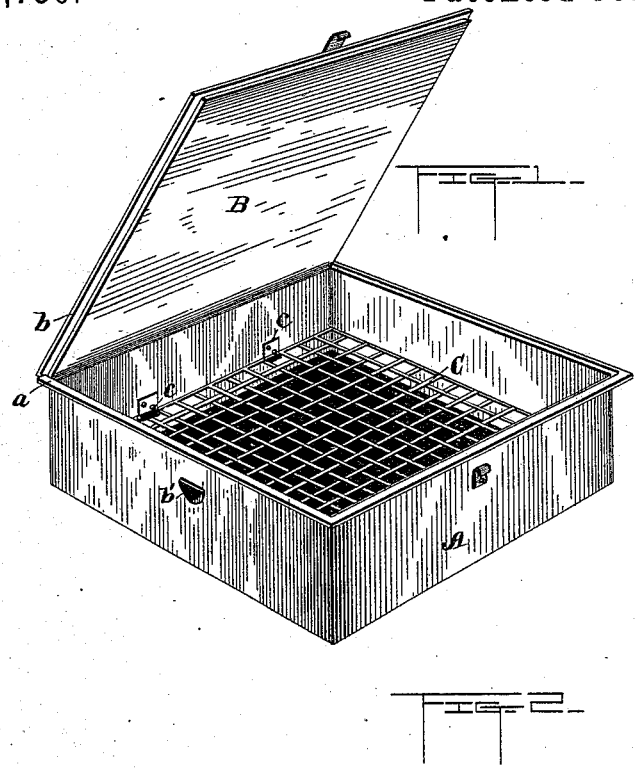
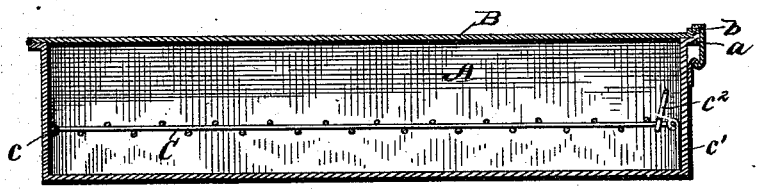
Witnesses
R. B. Seward
Benj. G. Cowl
Christopher C. Davis, Inventor
By his Attorneys James G. Young
and E. C. Seward

UNITED STATES PATENT OFFICE.

CHRISTOPHER C. DAVIS, OF KANSAS CITY, MISSOURI.

COOKING UTENSIL.

SPECIFICATION forming part of Letters Patent No. 412,730, dated October 15, 1889.

Application filed June 3, 1889. Serial No. 312,987. (No model.)

*To all whom it may concern:*

Be it known that I, CHRISTOPHER C. DAVIS, a citizen of the United States, residing at Kansas City, in the county of Jackson and State of Missouri, have invented certain new and useful Improvements in Cooking Utensils; and I do hereby declare the following to be a full, clear, and exact description of the invention, such as will enable others skilled in the art to which it appertains to make and use the same.

My invention relates to cooking utensils, and more especially to utensils for toasting bread and broiling steaks over gas or vapor stoves.

The object is to provide a utensil that will exclude the smoke and disagreeable odor arising from the burning fuel; furthermore, to provide a utensil that will prevent the escape of the flavor of the steak or other article, and, finally, to provide a utensil that will be simple in construction, inexpensive of production, and exceedingly useful for the purpose for which it is designed.

With these ends in view my invention consists in certain features of construction and combinations of parts, as will be hereinafter described, and pointed out in the claims.

In the accompanying drawings, Figure 1 is a perspective view of a cooking utensil with its cover raised, and Fig. 2 is a central vertical sectional view of the same, showing the cover closed.

A represents a pan or receptacle, shown in this instance as rectangular in form and provided with a hinged cover B. The upper edge of the pan is provided with a laterally-projecting flange $a$, which receives the flange $b$, projecting laterally from the cover B, thus making an air-tight joint. The pan is provided upon one of its sides with a socket $b'$, which affords means for lifting the utensil from the stove by an ordinary stove-lid hook and carrying it to any part of the room. Hinged at $c$ to the inner wall of the pan, a slight distance above its bottom, is a reticulated frame or grate C, shown in this instance as consisting of a rectangular wire frame having secured thereto a strip of wire fabric of coarse mesh and provided at a point opposite to its hinged engagement with the pan with a leg $c'$, which supports the grate above the pan-bottom. A handle or bail $c^2$ may be secured to the grate for the purpose of lifting it to afford access to the pan in cleaning it. It will be noticed that, due to the air-tight engagement of the cover with the pan, the fumes of the articles being cooked are prevented from escaping, thus causing the article to retain its own flavor.

In broiling steak the juice is collected in the bottom of the pan and is drained off for use when the steak is removed, the steak having in all respects the taste and flavor of a steak broiled over a coal fire.

Having thus fully described my invention, I claim—

1. The combination, with a pan provided with an air-tight cover, of a reticulated grate hinged to the interior wall of said pan above its bottom, a leg to support the opposite end of said grate above the bottom of the pan, and a bail secured to the free end of said grate, substantially as set forth.

2. The combination, with a pan provided with an air-tight cover, of a reticulated grate hinged to the interior wall of said pan above its bottom, and a support for the opposite edge of said grate.

3. The combination, with a pan provided with an air-tight cover and a socket adapted to be engaged by a stove-lid hook, of a grate inclosed within said pan and supported above its bottom.

In testimony whereof I affix my signature in presence of two witnesses.

CHRISTOPHER C. DAVIS.

Witnesses:
BESSIE E. YOUNG,
F. T. DAVIS.